United States Patent

[11] 3,582,184

| [72] | Inventors | Allen F. Golden<br>Los Altos, Calif.;<br>Robert R. Vokes, Hudson, N.H. |
|---|---|---|
| [21] | Appl. No. | 865,924 |
| [22] | Filed | Oct. 13, 1969 |
| [45] | Patented | June 1, 1971 |
| [73] | Assignee | The United States of America as represented by the Secretary of the Navy |

[54] HIGH-SPEED OPTICAL MODULATOR USING A FLUID OSCILLATOR
2 Claims, 1 Drawing Fig.

[52] U.S. Cl. .................................................. 350/160, 350/285
[51] Int. Cl. ...................................................... G02f 1/28, G02f 1/34
[50] Field of Search.......................................... 350/160, 267, 285, 199

[56] References Cited
UNITED STATES PATENTS

| 2,997,922 | 8/1961 | Kaprelian | 350/285 |
| 3,443,098 | 5/1969 | Lewis | 250/199 |

*Primary Examiner*—Ronald L. Wibert
*Assistant Examiner*—V. P. McGraw
*Attorneys*—R. S. Sciascia, H. H. Losche and Paul S. Collignon

ABSTRACT: A high-speed optical modulator comprised of a fluid oscillator having first and second output channels and means for alternately switching a fluid stream into the first and second output channels. The first output channel serves as part of an optical prism, and air and liquid are alternately present in the first output channel to provide different indices of refraction so that light passing through the optical prism is alternately partially and totally reflected.

PATENTED JUN 1 1971 3,582,184
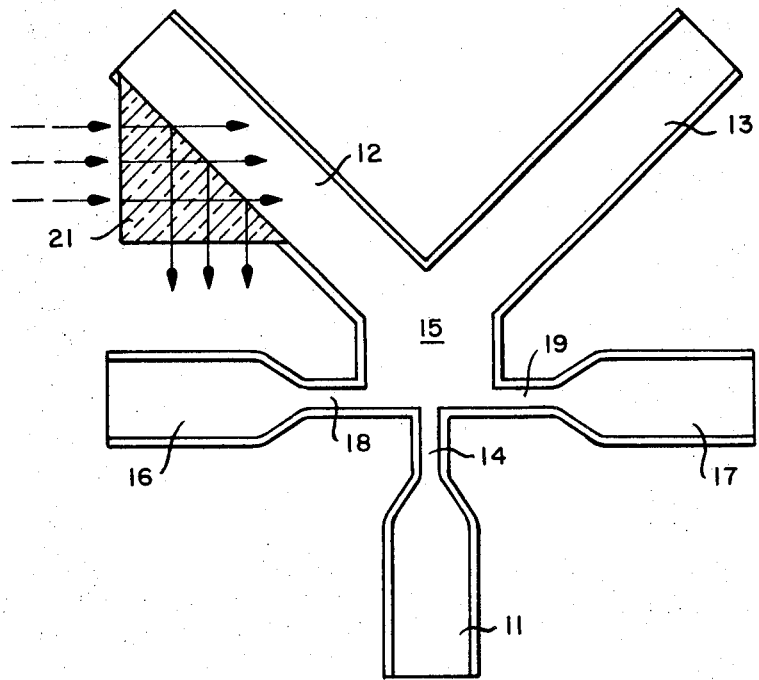
INVENTORS
ALLEN F. GOLDEN
ROBERT R. VOKES
BY H. H. Losch
Paul S. Collignon
ATTORNEYS

HIGH-SPEED OPTICAL MODULATOR USING A FLUID OSCILLATOR

BACKGROUND OF THE INVENTION

The invention of the laser, which generates highly collimated optical waves, has stimulated interest in the use of optical waves for communication and other purposes. In order to make full use of optical waves, however, it has been necessary to develop new circuit components, such as optical wave modulators.

Various devices have, in the past, been utilized for modulating light beams. One such device is the Kerr cell wherein modulation is achieved by passing light between two parallel electrically charged plates inserted in a glass cell containing liquid, such as nitrobenzine. When the electric field is off, no light is transmitted, but when the electric field is on, the liquid becomes doubly refracting and the light is restored.

In U.S. Pat. No. 3,367,733, which issued Feb. 6, 1968, to Gerhard Grau, there is shown and described an apparatus for modulating linearly polarized radiation, such as issues from a laser. The monochromatic beam to be controllably deflected is passed through a prism of material having a field-responsive refraction index that varies with the strength of an electric or magnetic field to which the material is subjected. The prism is formed with two nonparallel interfaces and these interfaces are traversed by the beam of monochromatic radiation with at least one of the angles of incidence and refraction differing from a right angle. Deflection control is obtained from magnetic as well as electric fields whose variation causes the refractive power of the material to vary accordingly. This utilizes the Kerr effect, the Cotton-Mouton effect, and the Voigt effect. According to the latter, a liquid, such as nitrobenzol, when exposed to an electric or magnetic field, becomes birefringent, i.e., double-refracting.

SUMMARY OF THE INVENTION

The present invention relates to a high-speed optical modulator which utilizes a fluid oscillator for switching. A fluid oscillator, having an input channel, first and second output channels, and control channels, is utilized with the first output channel being incorporated as part of an optical prism. In operation of the fluid oscillator, liquid is oscillated, alternately, between the two output channels and thus the index of refraction of the optical prism is changed so that light passing through the optical prism is alternately partially and totally reflected.

BRIEF DESCRIPTION OF THE DRAWING

The FIGURE of the drawing is a side view showing a preferred embodiment of the present invention.

DESCRIPTION OF THE PREFERRED EMBODIMENT

Referring now to the drawing there is shown a typical fluid oscillator having an input channel 11, first output channel 12 and a second output channel 13. Input channel 11 is provided with a power jet nozzle 14 for introducing fluid under pressure to interaction region 15. A left control channel 16 and a right control channel 17 are provided and these control channels have nozzles 18 and 19, respectively, that communicate with interaction chamber 15. The construction and operation of fluid oscillators are well known in the art and more specific details and theory of operation may be found in either U.S. Pat. No. 3,016,066, which issued Jan. 9, 1962, to R. W. Warren or U.S. Pat. No. 3,320,966, which issued May 23, 1967, to E. L. Swartz.

The first output channel 12 is incorporated with a prism 21 to provide modulation of a light beam directed at the prism. When air is in output channel 12, a critical angle is defined by the indices of refraction of the prism-air interface. Light incident on the interface at angles equal to or greater than the critical angle will be totally reflected. When fluid, such as water or alcohol, which have a greater index of refraction than air, is present in first output channel 12, a different critical angle is presented at the interface such that light is not totally reflected but is transmitted across the interface. As liquid is switched or oscillated from one output channel to the other, optical modulation is achieved.

It can thus be seen that the present invention provides a relatively simple device for achieving optical modulation at high frequencies.

We claim:
1. An optical modulator comprising,
   a fluid oscillator having first and second output channels and means for alternating liquid flow in said output channels, and
   a prism adjacent said first output channel whereby air in said first output channel provides a first index of refraction at the interface of said prism and said air and whereby liquid in said first output channel provides a second index of refraction at the interface of said prism and said liquid.
2. An optical modulator as set forth in claim 1 wherein said liquid is water.